United States Patent [19]
Nakada

[11] Patent Number: 5,881,694
[45] Date of Patent: Mar. 16, 1999

[54] FUEL INJECTION CONTROL SYSTEM FOR IN-CYLINDER DIRECT INJECTION, SPARK-IGNITION INTERNAL COMBUSTION ENGINES

[75] Inventor: Naoki Nakada, Chiba, Japan

[73] Assignee: Nissan Motor Co., Ltd., Yokohama, Japan

[21] Appl. No.: 22,843

[22] Filed: Feb. 12, 1998

[30] Foreign Application Priority Data

Feb. 12, 1997 [JP] Japan ................................. 9-027689

[51] Int. Cl.⁶ ................................................. F02D 41/06
[52] U.S. Cl. ..................................... 123/305; 123/179.16
[58] Field of Search ................................. 123/295, 305, 123/491, 179.16

[56] References Cited

U.S. PATENT DOCUMENTS

| | | | |
|---|---|---|---|
| 4,926,806 | 5/1990 | Ahern | 123/305 |
| 5,322,044 | 6/1994 | Maebashi | 123/305 |
| 5,735,241 | 4/1998 | Matsuura | 123/491 |

FOREIGN PATENT DOCUMENTS 8-193536   7/1996   Japan .

Primary Examiner—Erick R. Solis
Attorney, Agent, or Firm—Foley & Lardner

[57] ABSTRACT

A fuel injection control system for an in-cylinder direct injection, spark-ignition internal combustion engine employing a fuel injector through which fuel is injected directly into a combustion chamber of each of engine cylinders, comprises an engine-cylinder identification circuit for identifying an angular phase of each of the engine cylinders and for making a cylinder identification action, a first interrupt-injection circuit for executing a first interrupt injection operation for a first engine cylinder being on an intake stroke just after completion of the first cylinder identification action executed by the engine-cylinder identification circuit during an engine starting period, when exceeding a normal injection timing at the intake stroke for the first engine cylinder, and a second interrupt-injection circuit for executing a second interrupt injection operation for a second engine cylinder being on a compression stroke just after completion of the first cylinder identification action executed by the engine-cylinder identification circuit during the engine starting period, when exceeding a normal injection timing at the intake stroke for the second engine cylinder.

8 Claims, 4 Drawing Sheets

FUEL INJECTION CONTROL SYSTEM FOR IN-CYLINDER DIRECT INJECTION, SPARK-IGNITION INTERNAL COMBUSTION ENGINES

The contents of application No. TOKUGANHEI 9-27689, filed Feb. 12, 1997, in Japan is hereby incorporated by reference.

BACKGROUND OF THE INVENTION

1. Field of the Invention

The present invention relates to a fuel injection control system for an in-cylinder direct injection, spark-ignition internal combustion engine employing a fuel injection valve or a fuel injector in which fuel is injected directly into the combustion chamber of each engine cylinder, and specifically to technologies of improving the engine's startability and ensuring good starting performance in in-cylinder fuel direct injection, spark-ignition internal combustion engines.

2. Description of the Prior Art

In conventional in-cylinder fuel direct injection, spark-ignition engines, during cold-engine start, the injector pulse width for engine starting is set and also a proper fuel injection timing is achieved, depending on at least the engine coolant temperature. One such conventional fuel injection controller for an in-cylinder fuel direct injection, spark-ignition engine has been disclosed in Japanese Patent Provisional Publication No. 8-193536. The prior-art fuel injection controller of a fuel direct injection, spark-ignition engine, as disclosed in the Japanese Patent Provisional Publication No. 8-193536, is generally designed in such a manner as to inject or spray fuel into the engine cylinders until the controller identifies or discriminates an engine cylinder. That is to say, in one sequential fuel-injection method such as port fuel injection of injecting fuel into the intake-air passageway upstream of the intake valve port, during the engine starting period, it is possible to enhance or improve the engine's startability by simultaneous injection of fuel into each of the engine cylinders before the engine-cylinder identification or discrimination is completed. On the contrast, in the other sequential fuel-injection method such as fuel direct injection of injecting fuel directly into the combustion chamber of each engine cylinder, there is a problem that the fuel injected into the working engine cylinder being on the exhaust stroke is exhausted through the exhaust port and a lot of unburned fuel vapors pass through the exhaust system, assuming that the previously-noted simultaneous fuel injection with respect to all of the engine cylinders is made before the engine-cylinder identification is completed. For the reasons discussed above, in fuel direct injection, spark-ignition engines, fuel injection is usually initiated after the engine-cylinder identification is completed. However, when exceeding a usual or normal fuel injection timing (based on at least a crank angle) for a first engine cylinder being on its intake stroke at the time when the engine-cylinder identification has been completed, the first fuel injection is initiated at a usual fuel injection timing for a second engine cylinder coming up on its intake stroke subsequently to the first engine cylinder and then the second engine cylinder is spark-ignited, thus retarding the initial explosion in the combustion chamber by two ignition actions during the engine cranking and starting period. This deteriorates the engine's startability.

SUMMARY OF THE INVENTION

Accordingly, it is an object of the invention to provide a fuel injection control system for an in-cylinder direct injection, spark-ignition internal combustion engine which avoids the aforementioned disadvantages of the prior art.

It is another object of the invention to provide an electronic fuel injection control system for an in-cylinder direct injection, spark-ignition internal combustion engine, which enhances the engine's startability.

In order to accomplish the aforementioned and other objects of the present invention, a fuel injection control system for an in-cylinder direct injection, spark-ignition internal combustion engine employing a fuel injector through which fuel is injected directly into a combustion chamber of each of engine cylinders, comprises an engine-cylinder identification circuit for identifying an angular phase of each of the engine cylinders and for making a cylinder identification action, a first interrupt-injection circuit for executing a first interrupt injection operation for a first engine cylinder being on an intake stroke just after completion of the first cylinder identification action executed by the engine-cylinder identification circuit during an engine starting period, when exceeding a normal injection timing at the intake stroke for the first engine cylinder, and a second interrupt-injection circuit for executing a second interrupt injection operation for a second engine cylinder being on a compression stroke just after completion of the first cylinder identification action executed by the engine-cylinder identification circuit during the engine starting period, when exceeding a normal injection timing at the intake stroke for the second engine cylinder. With the previously-noted arrangement, even when exceeding a normal injection timing for the second engine cylinder being on the intake stroke just after completion of the first cylinder identification action, the first interrupt injection operation for the first engine cylinder being on the intake stroke and the second interrupt injection operation for the second engine cylinder being on the compression stroke can be made. This advances the timing of initial explosion in the combustion chamber at the engine starting period by two ignition actions after completion of the cylinder identification action, and thus greatly enhances the engine's startability.

The fuel injection control system may further comprise an interrupt-injection enable-and-disable decision circuit for deciding on the basis of an injector pulse width required for the engine starting period whether each of the first and second interrupt injection operations is enabled or disabled. The provision of the interrupt-injection enable-and-disable decision circuit is effective to prevent or inhibit an unreasonable interrupt injection operation. It is preferable that the interrupt-injection enable-and-disable decision circuit may include a comparison means for comparing the injector pulse width required for the engine starting period with a maximum permissible injector pulse width required for a fuel-injection operation for the first engine cylinder being on the intake stroke and for comparing the injector pulse width required for the engine starting period with a maximum permissible injector pulse width required for a fuel-injection operation for the second engine cylinder being on the compression stroke. The comparison means of the systems enables a precise decision so that at least one of the first and second interrupt injection operations be enabled or disabled. More preferably, the interrupt-injection enable-and-disable decision circuit may include means for setting the maximum permissible injector pulse width required for the fuel-injection operation for the second engine cylinder being on the compression stroke depending on a fuel pressure of fuel delivered into the fuel injector, and means for setting the maximum permissible injector pulse width required for the fuel-injection operation for the first engine cylinder being on the intake stroke depending on the fuel pressure. The setting of the maximum permissible injector pulse widths based on the fuel pressure effectively prevents back-flow of the fuel to the injector.

DESCRIPTION OF THE PREFERRED EMBODIMENTS

Figure 1:
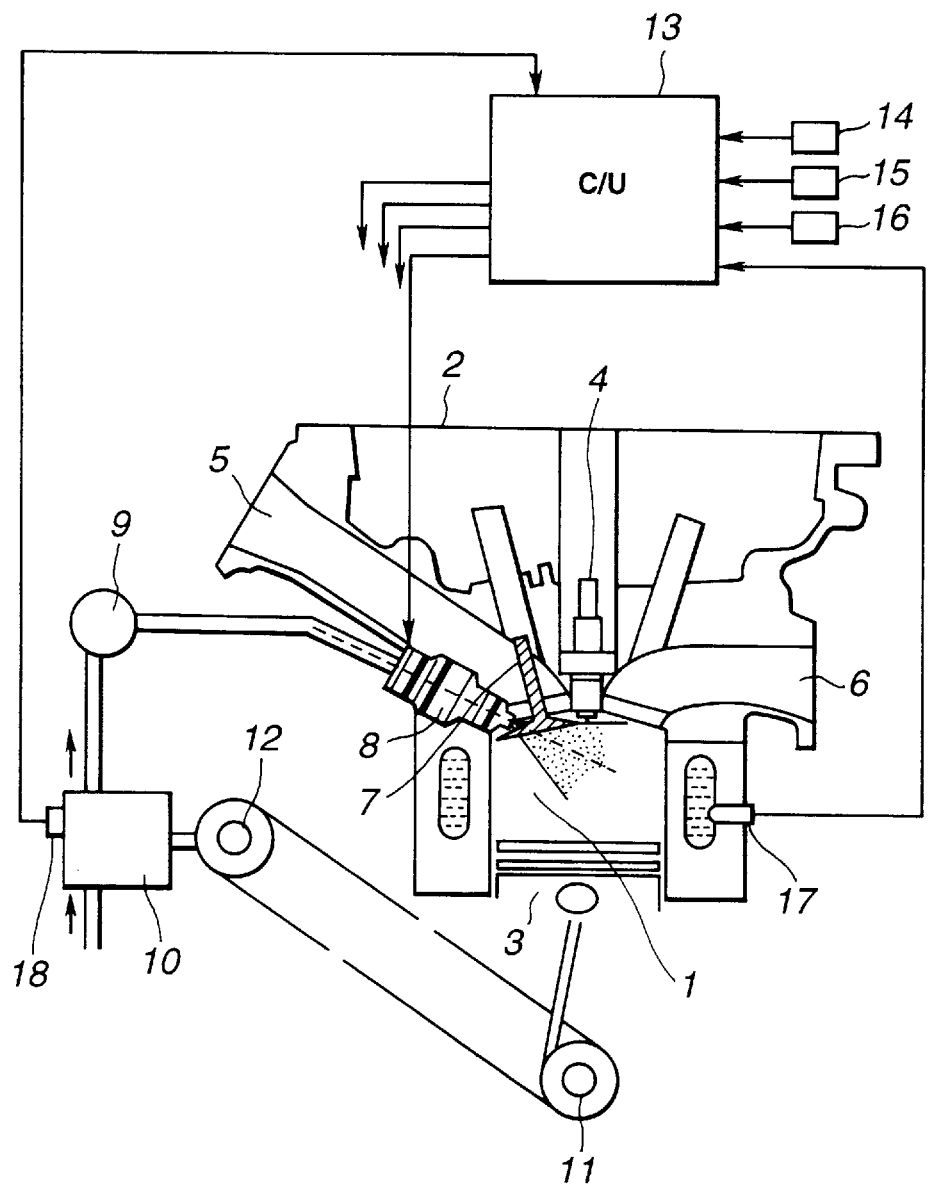
FIG. 1 is a system operational diagram illustrating an embodiment of an electronic fuel injection control system for an in-cylinder direct injection, spark-ignition internal combustion engine.

Referring now to the drawings, particularly to FIG. 1, there is shown a system schematic or the electronic fuel injection control system of the embodiment, for use in an in-cylinder direct injection, spark-ignition internal combustion engine employing a fuel injection valve (or a fuel injector) through which fuel is injected directly into the combustion chamber of each engine cylinder. The combustion chamber 1 of each engine cylinder us defined between the cylinder head 2 and the piston 3. A spark plug 4 is provided in the cylinder head 2. Intake-vale port 5 and exhaust-valve port 6 are formed in a manner so as to surround the essentially center-located spark plug 4. An intake valve 7 and an exhaust valve (not shown) are provided in each of the engine cylinders. As seen in FIG. 1, the fuel injection valve or the fuel injector 8 is located just back of the intake valve of the associated engine cylinder, so that the fuel is injected or sprayed directly into the combustion chamber 1 of each engine cylinder. The system uses a high-pressure fuel pump 10 to provide the fuel to a fuel gallery or a fuel rail 9 common to all of the engine cylinders. The high-pressure fuel pump 10 is driven by a camshaft 12 which has a belt-driven connection with an engine crankshaft 11. A low-pressure fuel pump (not shown) is often provided to deliver fuel from the fuel tank to the high-pressure fuel pump 10. Usually, the high-pressure fuel pump 10 further pressurizes the fuel transferred from the low-pressure fuel pump, and the pressurized fuel is delivered into the fuel gallery 9. The opening and closing of the fuel injector 8 is controlled in response to an injector pulse signal from an electronic control unit 13 often abbreviated to "ECU" or "C/U". In the shown embodiment, a typical solenoid-operated fuel injector is used. The opening and closing of the fuel injector 8 is its duty cycle. Thus, how long the C/U signals the injector remain open is an injector pulse width. In other words, the amount of fuel injected into the cylinder is varied depending on the pulse width of the injector pulse signal. The input/output interface of the electronic control unit 13 receives input informational signals from various sensors, namely a crank angle sensor 14, an engine-cylinder identification sensor 15, an air-flow meter 16, a coolant temperature sensor 17, and a fuel pressure sensor 18. Then the control unit 13 determines the amount of fuel injected, in response to the input information. The air flow meter 18 is provided to detect or measure the actual amount or volume Qa of intake-air drawn into the engine cylinders. The coolant temperature sensor 17 is located on the engine to sense the actual operating temperature of the engine (the coolant temperature Tw). The fuel pressure sensor 18 is mounted on the outlet port of the high-pressure fuel pump 10 for detecting or measuring a fuel pressure Pf of the fuel delivered into the fuel gallery 9. Assuming that the number of engine cylinders is denoted by "n", the crank angle sensor 14 (or the crankshaft position sensor) outputs a reference pulse signal REF at a predetermined crankshaft angular position once for each predetermined crank angle ($720°/n$). The crank angle sensor 14 also generates a unit pulse signal POS every unit crank angle such as $1°$ or $2°$. The processor of the electronic control unit 13 is designed to calculate the engine speed Ne on the basis of a time period of the reference pulse signal REF. The previously-noted engine-cylinder identification sensor 15 is often called a "camshaft position sensor". The cylinder identification sensor 15 outputs a cylinder identification signal PHASE for a particular engine cylinder once for each rotation of the camshaft. That is, the cylinder identification signal PHASE is outputted at a predetermined crank angle once for each crank angle $720°$ (for each two revolutions of the engine crankshaft) because the camshaft is driven by the engine crankshaft at ½ the speed of the crankshaft for opening and closing the intake and exhaust valves. Alternatively, the cylinder identification sensor 15 may be designed to output either one of different cylinder identification signals, each having an inherent pulse number and pulse width different from the other cylinder identification signals, for each predetermined crank angle ($720°/n$). In this case, there is a one-to-one correspondence between the different cylinder identification signals and the engine cylinders. That is, the cylinder identification sensor may be constructed by any means for ensuring the cylinder identification.

Figure 2:
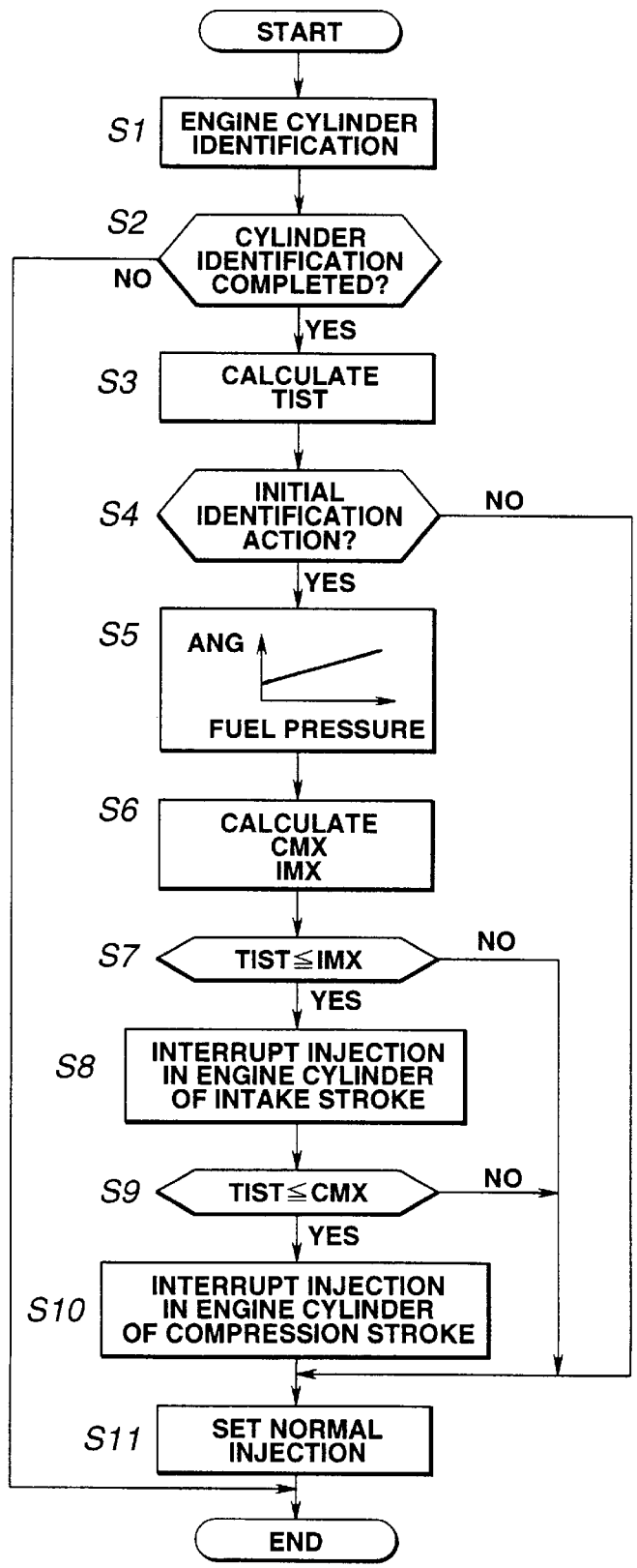
FIG. 2 is a flow chart illustrating a fuel-injection control routine executed by the system of the embodiment, during the engine cranking and starting period.

Hereinafter described in detail by reference to the flow chart shown in FIG. 2 is the fuel-injection control routine executed by the electronic control unit 13 during the engine cranking and starting period. The routine shown in FIG. 2 is executed as time-triggered interrupt routines to be triggered in synchronization with the reference pulse signal REF or at a time when a predetermined number of pulses in the unit pulse signal POS has been counted from the beginning of generation of the reference pulse signal REF.

In step S1, an engine cylinder identification is made on the basis of the cylinder identification signal PHASE from the sensor 15. In more detail, the control unit 13 first determines whether the input of the cylinder identification signal PHASE is present. In presence of the input of the cylinder identification signal PHASE, the control unit 13 initiates the cylinder identification action. In step S2, a check is made to determine whether the cylinder identification action has been completed. If the cylinder identification action is not yet completed, the current routine terminates. When the answer to step S2 is in the affirmative (YES), step S3 occurs. In step S3, an injector pulse width TIST required for the engine starting period is arithmetically calculated on the basis of at least the engine coolant temperature Tw detected by the sensor 17. In more detail, in step S3, a reference injector pulse width (Tp) is first calculated on the basis of both the intake-air quantity Qa detected by the air flow meter 18 and the engine speed Ne derived from the signal from the crank angle sensor 14, and then the control unit 13 compensates for the calculated reference injector pulse width (Tp) depending on at least this coolant temperature Tw detected by the sensor 17 during the engine starting period. Actually, the compensated injector pulse width is used as the starting-period injector pulse width TIST. In step S4, a test is made to determine whether a series of engine-cylinder identification actions of steps 1 and 2 corresponds to the first engine-cylinder identification executed just after the engine is started by turning the ignition switch on. When the answer to step S4 is affirmative (YES), that is, when the first engine-cylinder identification action has been completed through steps S1 and S2, step S5 is entered. In step S5, first, the fuel pressure Pf detected by the sensor 18 is read by the control unit 13, and then the control unit 13 retrieves a maximum permissible crank angle ANG obtainable at a timing of termination of fuel-injection operation from a preprogrammed map data representative of a specified relationship between the maximum permissible crank angle ANG and the fuel pressure Pf (see the map data indicated in step S5 of FIG. 2). As may be appreciated from the map data indicated by step S5 of FIG. 2, the greater the detected fuel pressure Pf, the greater the maximum permissible crank angle ANG, since the fuel having a high fuel pressure is injectable into compressed air in the combustion chamber even when the pressure in the combustion chamber is increased on the compression stroke. In step S6, the engine speed Ne is read. On the basis of the engine speed Ne and the maximum permissible crank angle ANG obtainable at the timing of termination of fuel-injection operation, a maximum permissible injector pulse width CMX required for fuel-injection operation during the compression stroke is calculated in accordance with the following expression (1). Additionally, a maximum permissible injector pulse width IMX required for fuel-injection operation during the induction stroke is calculated in accordance with the following expression (2) in case of a four-cylinder fuel direct injection engine, and in accordance with the following expression (3) in case of a six-cylinder fuel direct injection engine.

$$CMX=(60/Ne)\times(ANG/360°) \quad (1)$$

$$IMX=(60/Ne)\times\{(ANG+180°)/360°\} \quad (2)$$

$$IMX=(60/Ne)\times\{(ANG+120°)/360°\} \quad (3)$$

In step S7, the injector pulse width TIST required for the engine starting period is compared with the maximum permissible injector pulse width IMX required for injection operation during the induction process, in order to determine whether the calculated injector pulse width TIST is below the maximum permissible injector pulse width IMX for the injecting period at the induction stroke. When the answer to step S7 is affirmative, i.e., in case of TIST≦IMX, the control unit 13 determines that it is possible to perform an interrupt injection operation on the intake stroke. Then, in step S8, the control unit 13 outputs an injector pulse signal having the calculated pulse width TIST to the fuel injector 8 of the engine cylinder being on the intake stroke, so as to execute a desired first interrupt injection operation. Thereafter, in step S9, the injector pulse width TIST required for the engine starting period is compared with the maximum permissible injector pulse width CMX required for injection operation during the compression process, in order to determine whether the calculated injector pulse width TIST is below the maximum permissible injector pulse width CMX for the injecting period at the compression stroke. When the answer to step S9 is affirmative, i.e., in case of TIST≦CMX, the control unit 13 determines that it is possible to perform an interrupt injection operation on the compression stroke. Thus, in step S10, the control unit 13 outputs an injector pulse signal having the calculated pulse width TIST to the fuel injector 8 of the engine cylinder being on the compression stroke, so as to execute a desired second interrupt injection operation. After step S10, or in case of the negative answer to either one of steps S4, S7 and S9, step S11 occurs. In step S11, the control unit 13 sets a normal injection (or a usual injection) whose injection timing is based on at least the crank angle (the crankshaft angular position) detected by the crank angle sensor 14, with respect to the engine cylinder coming up on its intake stroke subsequently to the engine cylinder being on the intake stroke at the present moment. Therefore, the fuel is injected into the engine cylinder of the next intake stroke at the normal injection timing. In this manner, one cycle of the injection control routine of the system of the embodiment terminates. Returning to step S7, when the calculated injector pulse width TIST is greater than the maximum permissible injector pulse width IMX for the injecting period at the induction stroke. i.e., in case of TIST>IMX, the control unit 13 determines that it is impossible to perform the interrupt injection operation on the intake stroke, and thus the first interrupt injection operation is inhibited. As can be appreciated from the previously-noted expressions (1) through (3), the maximum permissible pulse width CMX for the injecting period of the compression stroke is permanently less than the maximum permissible pulse width IMX for the injecting period of the intake stroke. That is, the relationship between the two values CMX and IMX is expressed by the inequality IMX>CMX. For the reasons set out above, in case of TIST>IMX, the condition of TIST>IMX>CMX its satisfied and thus the control unit 13 also determines that it is impossible to perform the interrupt injection operation on the compression stroke, and thus the second interrupt injection operation is also inhibited. In the same manner as step S7, when the calculated injector pulse width TIST is greater than the maximum permissible injector pulse width CMX in step S9, i.e., in case of TIST>CMX, the control unit 13 determines that it is impossible to perform the interrupt injection operation on the compression stroke, and thus the second interrupt injection operation is inhibited. In the flow chart shown in FIG. 2, steps 1 and 2 essentially correspond to an engine-cylinder identification circuit or means for identifying an angular phase of each of the engine cylinders. Steps 4 and 8 essentially correspond to a first interrupt-injection circuit or means for executing a first interrupt injection operation for a first engine cylinder being on its intake stroke just after completion of the first cylinder identification action during the engine starting period, when exceeding a normal injection timing at the intake stroke for the first engine cylinder. Steps 4 and 10 essentially correspond to a second interrupt-injection circuit or means for executing a second interrupt injection operation for a second engine cylinder being on its compression stroke just after completion of the first cylinder identification action during the engine starting period, when exceeding a normal injection timing at the intake stroke for the second engine cylinder. Steps S5, S6, S7 and S9 essentially correspond to an interrupt-injection enable-and-disable decision circuit or means for deciding on the basis of an injector pulse width (TIST) required for the engine starting period as to whether each of the first and second interrupt injection operations is enabled or disabled.

Figure 3:
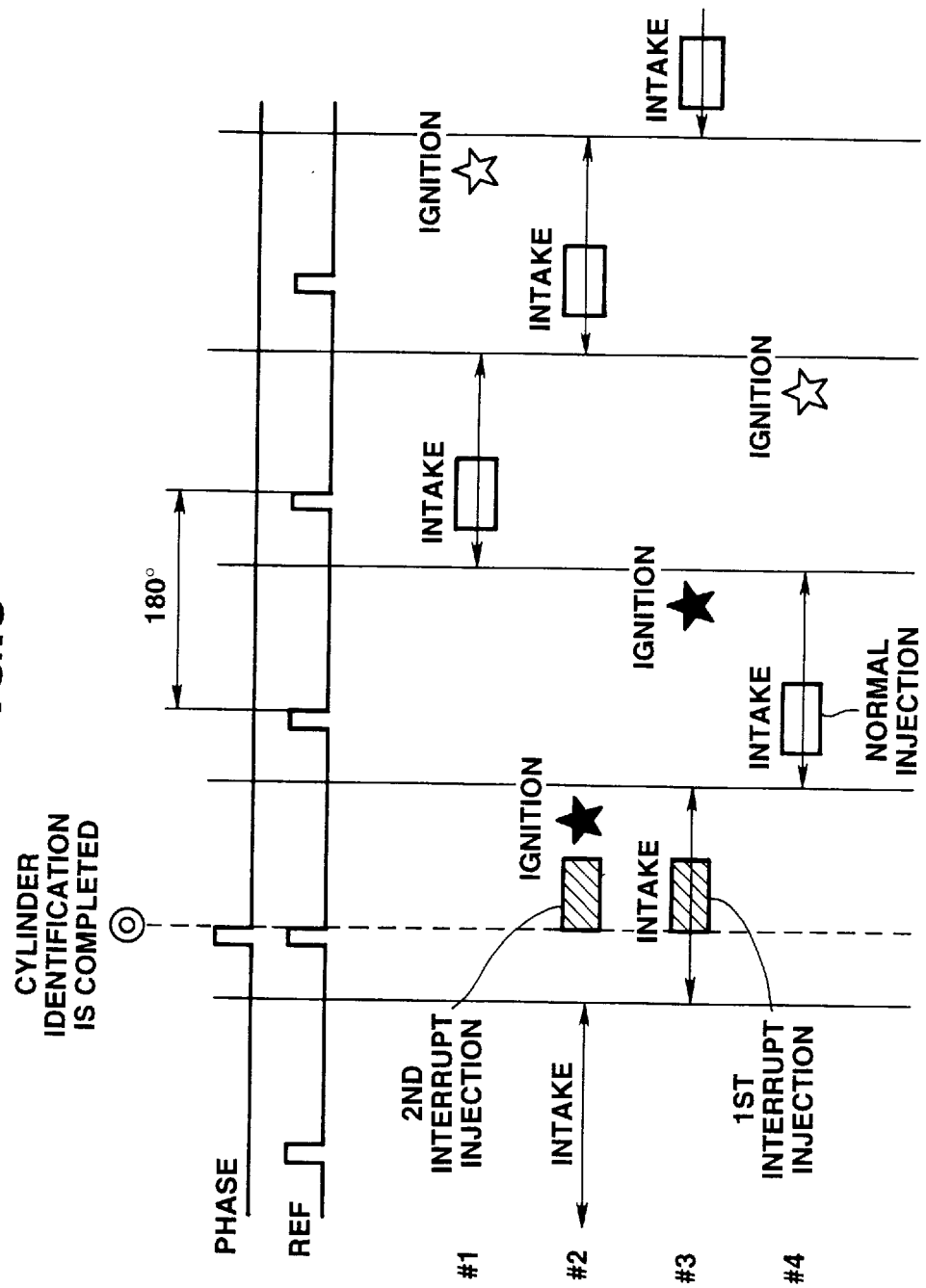
FIG. 3 is a timing chart illustrating a fuel injection operation (involving a usual fuel injection, an interrupt fuel injection occurring on a compression stroke of the Number 2 cylinder and an interrupt fuel injection occurring on an intake stroke of the Number 3 cylinder), in a four-cylinder fuel direct injection engine.
Figure 4:
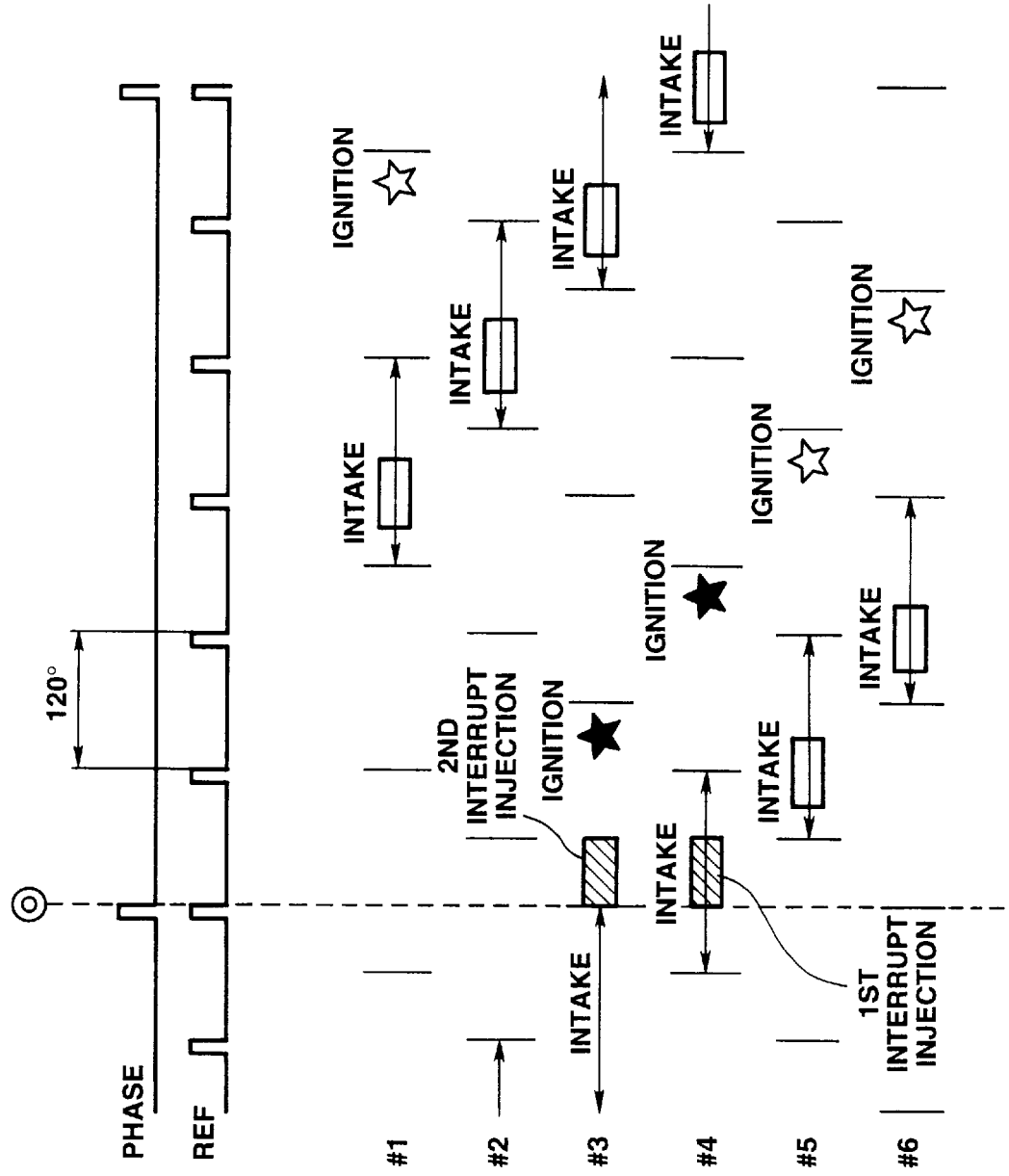
FIG. 4 is a timing chart illustrating a fuel injection operation (involving a usual fuel injection, an interrupt fuel injection occurring on a compression stroke of the Number 3 cylinder and an interrupt fuel injection occurring on an intake stroke of the Number 4 cylinder), in a six-cylinder fuel direct injection engine.

Referring now to FIGS. 3 and 4, details of the first and second interrupt-injection operating times are indicated by the respective hatched blocks. In FIGS. 3 and 4, PHASE means the cylinder identification signal from the camshaft position sensor 15, REF means the reference pulse signal from crank angle sensor 14, a point marked by "★" corresponds to an ignition point after the previously-discussed interrupt injection, and a point marked by "☆" corresponds to an ignition point after the normal injection. In case of a four-cylinder direct injection engine shown in FIG. 3, assuming that the engine-cylinder identification action has been completed at the time marked by "⊙", hitherto a fuel injection operation is initiated from the Number 4 (#4) cylinder whose injector is opened at the first normal injection timing after completion of the first cylinder identification during the engine starting period. On the other hand, in the system of the invention, even when exceeding a normal injection timing for the engine cylinder (corresponding to the Number 3 (#3) cylinder) being on its intake stroke just after the first cylinder identification action has been completed, the first and second interrupt injection operations can be made to the Number 3 cylinder being on its intake stroke and the Number 2 (#2) cylinder being on its compression stroke, respectively (see two hatched blocks in the timing chart of FIG. 3). Thus, the initial explosion in the combustion chamber at the engine starting period is advanced by two ignition actions (see the two ignition points marked by "★" of FIG. 3). Such advancement of the initial explosion contributes to enhancement of the engine's startablity and ensures good starting performance.

Likewise, in case of a six-cylinder direct injection engine shown in FIG. 4, assuming that the engine-cylinder identification action has been completed at the time marked by "⊙", hitherto a fuel injection operation is initiated from the Number 5 (#5) cylinder whose injector is opened at the first normal injection timing after completion of the first cylinder identification during the engine starting period. On the contrary, in the system of the invention, even when exceeding a normal injection timing for the engine cylinder (corresponding to the Number 4 (#4) cylinder) being on its intake stroke just after the first cylinder identification action has been completed, the first and second interrupt injection operations can be made to the Number 4 cylinder being on its intake stroke and the Number 3 (#3) cylinder being on its compression stroke, respectively (see two hatched blocks in the timing chart of FIG. 4). Thus, the initial explosion in the combustion chamber at the engine starting period is advanced by two ignition actions (see the two ignition points marked by "★" of FIG. 4). Such advancement of the initial explosion contributes to enhancement of the engine's startablity and ensures good starting performance.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A fuel injection control system for an in-cylinder direct injection, spark-ignition internal combustion engine employing a fuel injector through which fuel is injected directly into a combustion chamber of each of engine cylinders, comprising:

an engine-cylinder identification circuit for identifying an angular phase of each of the engine cylinders and for making a cylinder identification action;

a first interrupt-injection circuit for executing a first interrupt injection operation for a first engine cylinder being on an intake stroke just after completion of the first cylinder identification action executed by said engine-cylinder identification circuit during an engine starting period, when exceeding a normal injection timing at the intake stroke for said first engine cylinder; and a second interrupt-injection circuit for executing a second interrupt injection operation for a second engine cylinder being on a compression stroke just after completion of the first cylinder identification action executed by said engine-cylinder identification circuit during the engine starting period, when exceeding a normal injection timing at the intake stroke for said second engine cylinder.

2. The fuel injection control system as claimed in claim 1, which further comprises an interrupt-injection enable-and-disable decision circuit for deciding on the basis of an injector pulse width required for the engine starting period whether each of said first and second interrupt injection operations is enabled.

3. The fuel injection control system as claimed in claim 2, wherein said interrupt-injection enable-and-disable decision circuit includes means for comparing said injector pulse width (TIST) required for the engine starting period with a maximum permissible injector pulse width (IMX) required for a fuel-injection operation for said first engine cylinder being on the intake stroke and for comparing said injector pulse width (TIST) required for the engine starting period with a maximum permissible injector pulse width (CMX) required for a fuel-injection operation for said second engine cylinder being on the compression stroke.

4. The fuel injection control system as claimed in claim 3, wherein said interrupt-injection enable-and-disable decision circuit inhibits both said first and second interrupt injection operations when said injector pulse width (TIST) required for the engine starting period is above said maximum permissible injector pulse width (IMX) required for the fuel-injection operation for said first engine cylinder being on the intake stroke, and permits said first interrupt injection operation when said injector pulse width (TIST) required for the engine starting period is below said maximum permissible injector pulse width (IMX) required for the fuel-injection operation for said first engine cylinder being on the intake stroke, and permits said second interrupt injection operation when said injector pulse width (TIST) required for the engine starting period is below said maximum permissible injector pulse width (CMX) required for the fuel-injection operation for said second engine cylinder being on the compression stroke.

5. The fuel injection control system as claimed in claim 3, wherein said interrupt-injection enable-and-disable decision circuit includes means for setting said maximum permissible injector pulse width (CMX) required for the fuel-injection operation for said second engine cylinder being on the compression stroke depending on a fuel pressure (Pf) of fuel delivered into the fuel injector, and means for setting said maximum permissible injector pulse width (IMX) required for the fuel-injection operation for said first engine cylinder being on the intake stroke depending on the fuel pressure (Pf).

6. The fuel injection control system as claimed in claim 5, wherein each of said maximum permissible injector pulse width (CMX) required for the fuel-injection operation for said second engine cylinder being on the compression stroke and said maximum permissible injector pulse width (IMX) required for the fuel-injection operation for said first engine cylinder being on the intake stroke is increased as the fuel pressure (Pf) increases.

7. The fuel injection control system as claimed in claim 5, wherein said maximum permissible injector pulse width (CMX) required for the fuel-injection operation for said second engine cylinder being on the compression stroke is arithmetically calculated by an expression CMX=(60/Ne)×(ANG/360°), where Ne is an engine speed, and ANG is a maximum permissible crank angle obtainable at a timing of termination of fuel-injection operation and is based on said fuel pressure (Pf).

8. The fuel injection control system an claimed in claim 5, wherein said maximum permissible injector pulse width (IMX) required for the fuel-injection operation for said first engine cylinder being on the intake stroke is arithmetically calculated by an expression IMX=(60/Ne)×{(ANG+720°/n)/360°}, where Ne is an engine speed, ANG is a maximum permissible crank angle obtainable at a timing of termination of fuel-injection operation and n is the number of engine cylinders, and the maximum permissible crank angle (ANG) is based on said fuel pressure (Pf).

* * * * *